Figure 2:
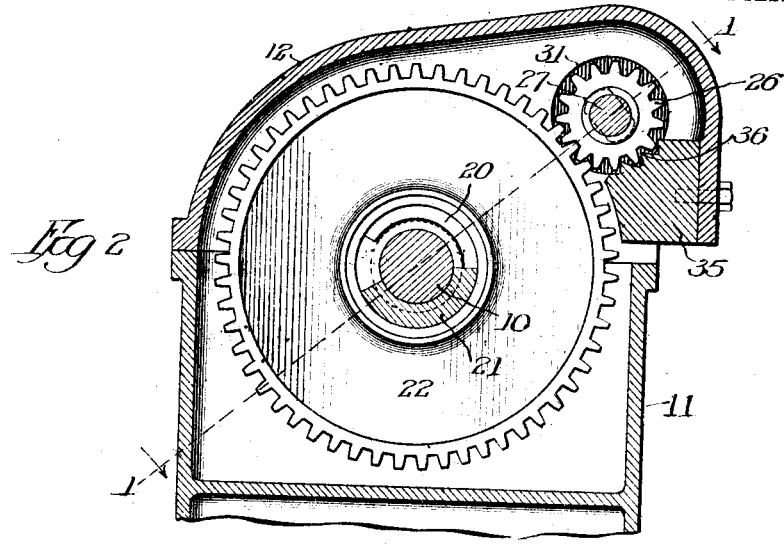

L. H. LINDSEY.
CRANE BRAKE.
APPLICATION FILED DEC. 30, 1912.

1,128,797.

Patented Feb. 16, 1915.

2 SHEETS—SHEET 1.

Witnesses:
Geo. C. Davison
Chas. T. Murray

Inventor:
L. H. Lindsey

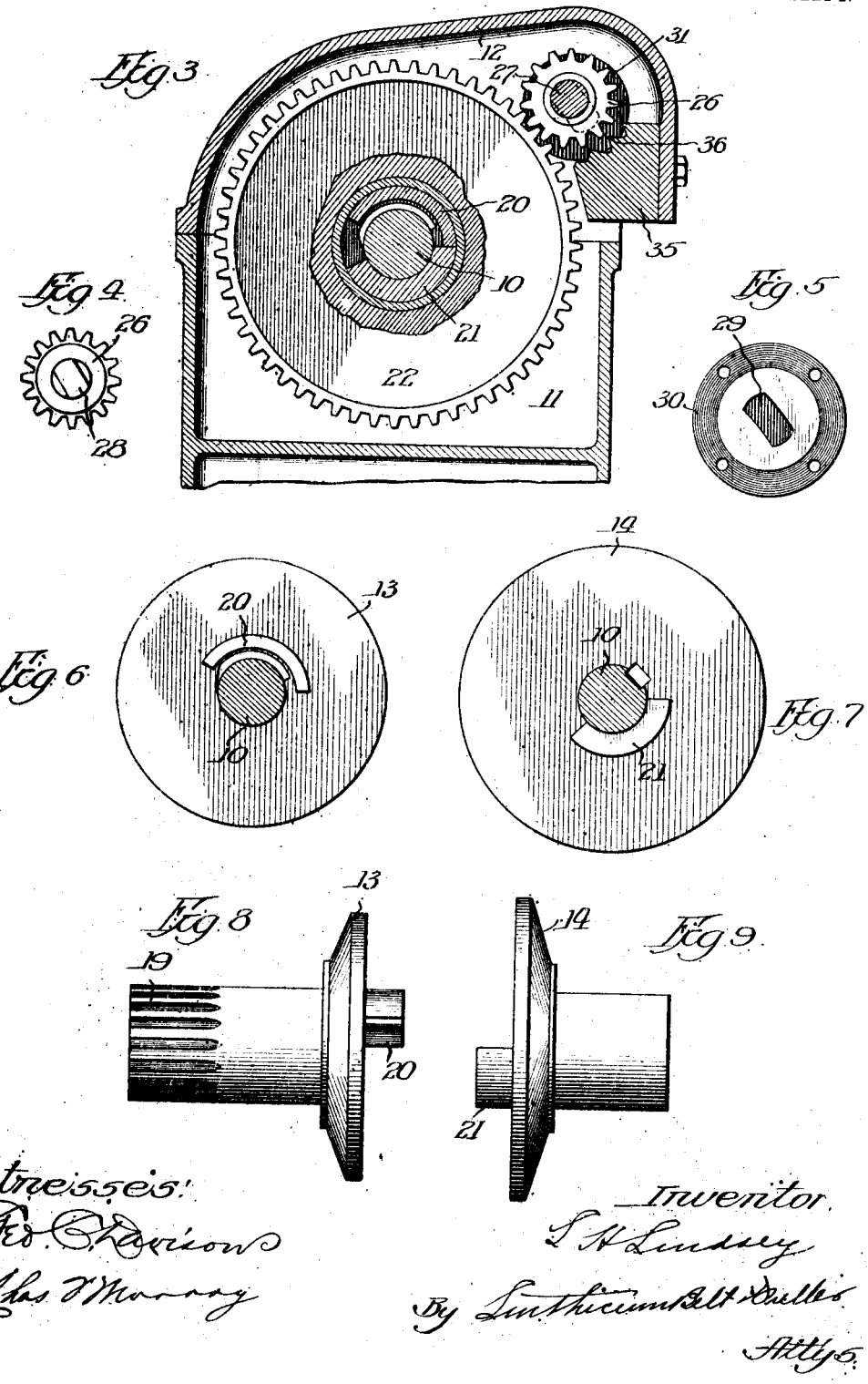

UNITED STATES PATENT OFFICE.

LEWIS H. LINDSEY, OF BIRMINGHAM, ALABAMA.

CRANE-BRAKE.

1,128,797.   Specification of Letters Patent.   Patented Feb. 16, 1915.

Application filed December 30, 1912. Serial No. 739,257.

*To all whom it may concern:*

Be it known that I, LEWIS H. LINDSEY, a citizen of the United States, and resident of Birmingham, in the county of Jefferson and State of Alabama, have invented certain new and useful Improvements in Crane-Brakes, of which the following is a specification.

My invention relates to hoisting devices and has particular reference to a novel brake for use on cranes.

In the use of cranes for the purpose of conveying materials, when the load is lowered the released weight cannot be allowed to drop, neither can its descent be advantageously controlled by the crane motor. It is therefore customary to employ an automatic brake controllable by the operator by means of which the load may be lowered gradually under the braking influence of certain friction elements. A disadvantage in such devices heretofore proposed is that the holding device, usually a toothed wheel and pawl, while providing sufficient strength under ordinary circumstances is frequently broken due to a sudden shock. The uncontrolled descent of a load such as a ladle containing fluid metal frequently results disastrously and it is an object of the present invention to provide a brake applicable to the crane cable drum which shall provide maximum engaging surfaces thus obviating the danger of breakage under a sudden shock.

A further object is the elimination in such a device of the usual pawl, the action of which is uncertain and which is easily broken.

In my device I contemplate the employment of the usual shaft having a pair of friction disks, one rotatable with the shaft and the other arranged for limited rotation by means of screw threaded engagement whereby the braking action of the disks may be controlled, a large gear loosely mounted on the shaft and providing a bearing surface for the disks, and a pinion constantly engaging the large gear and adapted for bodily movement toward and away from a plurality of rigid projections or teeth secured to the casing. The action of the pinion is automatic; its movement in either direction toward or away from the engaging stop is controlled by the direction of movement of the large gear, as for instance, when the load is being lifted the large gear will revolve in a direction tending to move the pinion out of engagement with the stops. In such case the brakes will have no influence the shaft rotating freely in the casing. However, on the lowering movement the gear tends to revolve in the opposite direction, thus carrying the pinion into engagement with the stops and preventing the further rotation of the gear. Thus any movement of the shaft must be after overcoming the frictional resistance exerted by the two disks.

Figure 1:
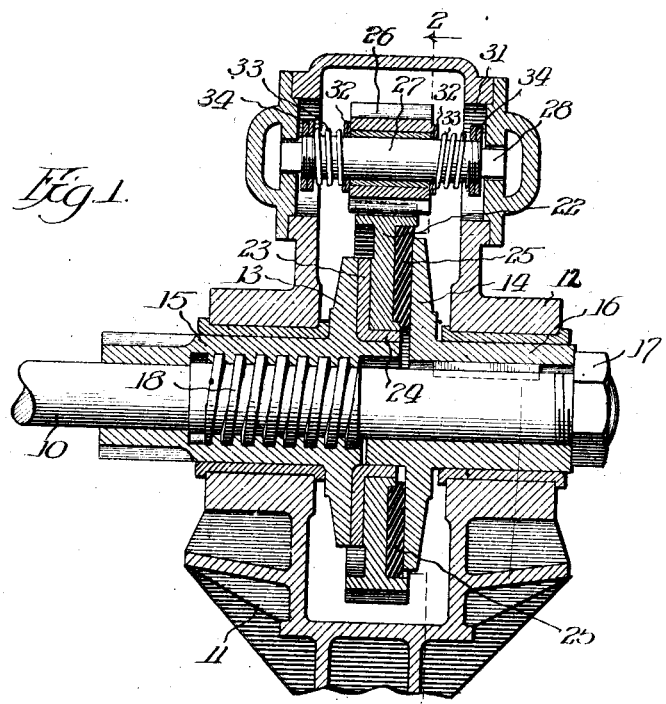

The invention will be more readily understood by reference to the drawings, in which, Figure 1 is a section on the line 1—1 of Fig. 2; Fig. 2 is a section on the line 2—2 of Fig. 1, showing the pinion in engagement with the rigid stops; Fig. 3 is a view similar to Fig. 2, showing the pinion disengaged from the stops; Fig. 4 is an end elevation of the pinion and shaft; Fig. 5 is an end elevation of the bearing provided in the casing for the pinion shaft; Fig. 6 is a face view of one of the friction disks; Fig. 7 is a similar view of the other friction disk, and Figs. 8 and 9 are side elevations of the disks shown in Figs. 6 and 7 respectively.

Referring more particularly to the drawings, it will be seen that a shaft 10, suitably connected to the cable drum, is mounted in a casing formed of lower and upper portions 11, 12, the lower portion of the casing being suitably mounted on a rigid portion of the crane. The shaft does not bear directly on the casing but is mounted within disks 13, 14. These disks are provided with long sleeves 15, 16 respectively, within which the shaft is accommodated. The disk 14 is suitably keyed to the shaft but is adapted for longitudinal adjustment thereon by means of a nut 17 threaded on the shaft. The shaft is provided with a plurality of screw threads 18 and the sleeve 15 of the disk 13 is interiorly threaded, and engages therewith. The outer end of the sleeve 15 is recessed to form teeth 19, adapted to be engaged by suitable gears, by means of which the disk may be rotated to a certain degree on the shaft whereby the frictional effort exerted may be controlled by the operator. In order to limit the motion of the disk I provide on the face of each disk 13, 14, arc-shaped projections 20, 21, the combined extent of which is less than 360° or a complete circle. The number of degrees less than three hundred and sixty indicates the extent of movement permitted by the disk 13 on its screw threads. This inter-engagement of the disks, one of which is keyed to the shaft, also requires the rotation of both disks with the shaft under all circumstances. A large gear 22 is mounted between the two disks 13, 14, a bearing being provided on a wearing plate 23. This wearing plate is seated against the face of the disk 13 and has a concentric projecting flange 24, fitting the concentric circular opening in the gear 22 and bearing on the two arc-shaped projections 20, 21 on the faces of the disks. Between the web of the gear 22 and the face of the friction disk 14 I provide a plate of suitable friction material 25.

With the mechanism thus far described there will be no braking action inasmuch as the friction disks would not operate without a stop for the gear. Such stop is provided in the pinion 26, rotatably mounted on the shaft 27, which shaft has squared or flattened ends 28, which ends are seated in the slots 29, in the bearing plates 30, suitably secured to the top portion 12 of the casing and covering apertures 31 therein, these apertures being of a size to permit the insertion and removal of the pinion 26. The pinion is centered on the shaft 27 and a slight friction resistance provided by means of plates 32, pressed against the pinion by means of right and left hand coil springs 33, the compression of the springs being controlled by the nuts 34 screw-threaded on the shaft. It will be noted that the slots 29, within which the ends of the shaft 27 are seated are inclined, the center line of which is formed from an arc struck from the center of the shaft 10. The stop for the pinion 26 is a block 35 of considerable size and strength rigidly secured to the upper portion 12 of the casing and provided on one face with a plurality of teeth 36. These teeth are strong and provide a comparatively large area of engagement with the teeth of the pinion obviating any possibility of breakage due to sudden shocks. It will be noted that the tendency of the pinion and its shaft will be to follow the periphery of the large gear 22, or perhaps, more correctly speaking, to move with the gear at a tangent. However, as tangential movement is not permitted, the pinion and its shaft will move under the rotative influence of the large gear to the extent permitted by the slot. This action is augmented by the frictional resistance against rotation of the pinion with relation to the shaft. It will be seen that the greater the resistance of the pinion to rotation, the greater the tendency of the pinion to follow the movement of the gear. The downward movement is, of course, assisted by gravity to a certain extent. It will be noted further that the pinion is of common commercial construction and need not be, as in the case of many of the devices at present in use, of special construction adapted to coöperate with a pawl or series of pawls. This fact taken in connection with the ready removability of the pinion through the opening 31 in the sides of the casing, provides means for ready inspection or repair.

It is obvious that modifications might be made in the exact construction shown such as in the location of the pinion with relation to the gear casing and in other features, all without departing from the spirit of my invention.

I claim:

1. In a crane brake, the combination of a casing having slots, a brake gear mounted in said casing, a pinion constantly engaging said gear, a shaft on which said pinion is mounted the ends of said shaft being carried in slots in said casing, said shaft being prevented from rotation within said slots, friction means for resisting rotation of said pinion on said shaft, and a stop carried by said casing and adapted to be engaged by said pinion, substantially as described.

2. In a device of the class described, the combination of a casing, a gear in said casing, said casing being provided with slots, a pinion shaft mounted in said slots and prevented from rotation therein, a pinion loosely mounted on said pinion shaft and in constant engagement with said gear, friction means between said pinion shaft and pinion, and a stop secured to said casing and arranged to be engaged by said pinion under the influence of said gear, substantially as described.

LEWIS H. LINDSEY.

Witnesses:
C. C. BURKE,
E. PITT.